Sept. 11, 1928.  1,684,074
E. SCHAEREN
INJECTION DEVICE FOR INTERNAL COMBUSTION ENGINES
Filed May 19, 1925
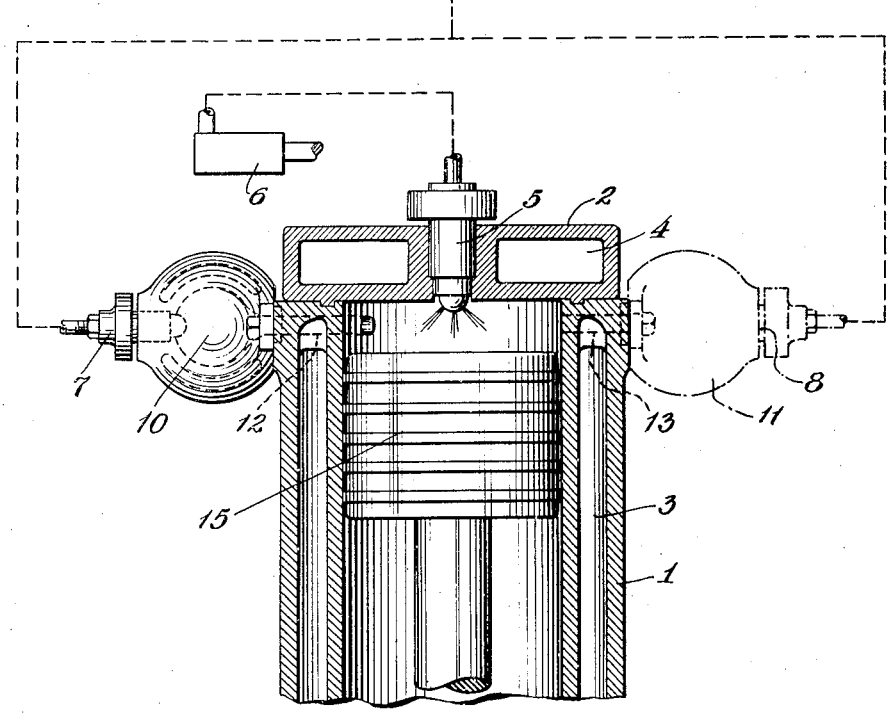
Fig.1,
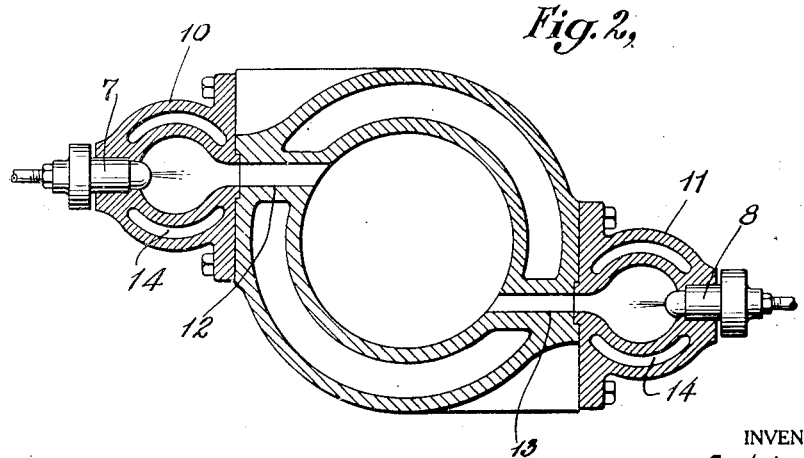
Fig.2,
INVENTOR
Ernst Schaeren
BY
Jeffery Kimball Eggleston
ATTORNEYS Patented Sept. 11, 1928.

1,684,074

UNITED STATES PATENT OFFICE.

ERNST SCHAEREN, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

INJECTION DEVICE FOR INTERNAL-COMBUSTION ENGINES.

Application filed May 19, 1925, Serial No. 31,259, and in Switzerland June 11, 1924.

My invention relates to an engine of the injection type otherwise complete and having in addition to the main fuel injection means, whether solid or otherwise, supplemental blast means adapted to discharge fluid medium into the combustion space for creating turbulence of the air and fuel therein to secure, in the difficult conditions presented especially in large engines of this type, a complete penetration by the fuel of the air highly compressed in the combustion space and a wide dispersal of fuel particles throughout all parts of its entire body. The blast delivered by this means is hot, that is, it has no material chilling effect on the cylinder contents. It is best produced by injection of supplementary fuel into a small explosion chamber or chambers, each in relatively restricted communication with the combustion space, and in which the turbulence-creating gas is heated by the combustion therein of the supplementary fuel, the products of the combustion flowing with great velocity into the combustion space and so agitating the air therein and the main fuel charge as to produce the required fuel dispersion throughout the entire mass with a consequent intimate air and fuel contact and resulting completeness of combustion of all the fuel. This end is promoted by relative angular location of the main fuel injector axis and the axis, or axes, of the blast devices as will hereinafter appear.

Referring to the drawings which are diagrammatic,

Fig. 1 is a central longitudinal section and Fig. 2 a transverse section in the central plane of the blast chambers.

In the embodiment of the invention thus illustrated, the engine cylinder 1 and cylinder head 2 are provided respectively with usual cooling spaces 3 and 4. While the invention is applicable both to solid injection engines and to air injection engines, the fuel injection means shown in the drawings is of the solid injection type and consists of the main fuel injector 5 mounted in the cylinder head and served by pump 6 of variable delivery or other known or suitable type, and a supplemental fuel injector, or injectors 7 and 8, to which are supplied amounts of fuel relatively small compared with the main fuel charge delivered by injector 5. These supplemental fuel injectors are served by a fuel pump 9. Separate pumps promote flexibility of relative timing of the main and supplemental fuel injections. The hot blast means is supplemental to an engine otherwise complete. In the form of hot-blast means illustrated, the blast is produced by combustion in blast chambers 10 and 11 to which the supplemental fuel injectors 7 and 8 respectively deliver, and which are in relatively restricted communication with the combustion space of the cylinder by passages 12, 13, located substantially tangentially with reference to the inner cylinder wall at the compression space for the purpose of setting up a whirling of the cylinder contents. The amount of fuel injected into each blast chamber being small, this whirl-producing function may be exercised without any back-fire and the blasts do not push the piston down but merely cause the whirling. These hot blast chambers are preferably water-cooled as indicated at 14, the combustion occurring on injection and ignition of the fuel by the heat of compression of the air forced by piston 15 into the blast chambers 10 and 11 through their respective connecting openings 12 and 13 on the compression stroke. The relative timing of the main fuel injection and the hot-blast, or blasts, may be varied somewhat and where there are several blasts they may be successive, but the main injection of fuel begins at or near compression dead center as customary and the hot-blast into the main combustion space occurs nearly coincidently with such injection, the result being to secure, at the right time, the wide fuel dispersal and consequent perfection and completeness of combustion referred to above as constituting a principal end of the invention. In addition to producing this turbulence in the cylinder contents the hot blast, in the preferred form, also adds to the heat of the cylinder contents, and in any case has no material chilling effect thereon.

In the drawings, the axis of the main fuel injector 5 is coincident with that of the engine cylinder, and the longitudinal axes of the blast chambers are in a plane perpendicular to the cylinder and fuel injector axis. It is to be understood, however, that this angular relation is not an inseparable feature of the invention, and that while it is preferred that an angular relation should exist between the main fuel injector axis and the axis or axes of delivery of the hot blast or blasts to the combustion space such relation may be considerably varied.

Claims:

1. In an injection type engine the combination with the main fuel injection means, of a hot-blast chamber in relatively restricted communication with and arranged to deliver substantially tangentially of the combustion space, and means for injecting into said hot-blast chamber supplementary fuel separately from the main fuel, whereby combustion of the supplementary fuel therein projects a turbulence-creating hot-blast into the combustion space.

2. In an injection engine the combination with the main fuel injection means, of a cooled hot-blast chamber in relatively restricted communication with the combustion space and arranged to deliver substantially tangentially of said space, and means for injecting into said hot-blast chamber supplementary fuel separately from the main fuel, combustion of the supplementary fuel ignited by heat of engine compression in said chamber projecting a turbulence-creating hot-blast into the combustion space, the main and supplementary fuel injection being timed to produce turbulence during combustion of the main fuel charge.

3. In an injection type engine the combination with the main fuel injector, of a plurality of hot-blast chambers arranged to deliver to the combustion space substantially tangentially thereof and in the same sense, and at an angle to the axis of the main fuel injector, and means for injecting supplementary fuel into said chambers separately from the main fuel.

In testimony whereof, I have signed this specification.

ERNST SCHAEREN.